United States Patent [19]
Vardell, Jr.

[11] 4,075,188
[45] Feb. 21, 1978

[54] RECOVERY OF CRUDE TALL OIL

[75] Inventor: William G. Vardell, Jr., Charleston, S.C.

[73] Assignee: Westvaco Corporation, New York, N.Y.

[21] Appl. No.: 654,383

[22] Filed: Feb. 2, 1976

[51] Int. Cl.² ............................................. C09F 1/00
[52] U.S. Cl. .................................. 260/97.7; 260/97.6
[58] Field of Search ............................. 260/97.6, 97.7

[56] References Cited
U.S. PATENT DOCUMENTS

| | | | |
|---|---|---|---|
| 2,575,013 | 11/1951 | Hasselstrom et al. | 260/97.7 |
| 3,901,869 | 8/1975 | Bills | 260/97.7 |

Primary Examiner—Melvyn I. Marquis
Assistant Examiner—Wm. Parker
Attorney, Agent, or Firm—Richard L. Schmalz; Ernest B. Lipscomb, III

[57] ABSTRACT

There is disclosed a process for the recovery of fatty acids and rosin acids from tall oil soap by acidification of crude soap with carbon dioxide in the presence of a water-immiscible solvent.

8 Claims, No Drawings

RECOVERY OF CRUDE TALL OIL

BACKGROUND OF THE INVENTION

1. Field of the Invention

This invention relates to an improved process for recovering crude tall oil from tall oil soap. More particularly, this invention relates to a process for the acidification of tall oil soaps with carbon dioxide in the presence of a water-immiscible solvent.

2. The Prior Art

Tall oil is obtained from the black liquor of the alkaline digestion of coniferous wood, most notably the kraft process. The black liquor is concentrated and allowed to settle, the tall oil soap-containing portion at pH about 12 rises as a top layer, and is skimmed off. The black liquor soap skimmings recovered from the kraft process are reacted with a strong polar acid, usually sulfuric acid, to reduce the pH to about 3.5, and thereby convert the crude tall oil soaps to their free-acid form.

Upon acidification of the tall oil soaps, the reaction mixture is allowed to settle and forms three layers — a crude tall oil layer, a lignin layer and a sulfate-brine layer. The sulfate-brine layer and lignin layers are returned to the pulp mill to recover the chemicals for use in the kraft pulping process. The crude tall oil layer is drawn off and placed in storage. The yield of crude tall oil varies somewhat depending upon the source of wood and the details of its processing, but the average recovery is about 1% based on the weight of wood pulped. The crude tall oil is then fractionally distilled to obtain approximately equal portions of rosin acids and fatty acids and to remove the greater portion of the odor and color-forming constituents.

Many pulp mills in recent years have been forced to eliminate effluent streams containing excessive amounts of sulfur compounds; and thus, the return of the sulfate-brine layer to the pulp mill may cause an intolerable build up of sulfur-containing chemicals in the pulp mill. Sulfuric acid acidification of tall oil soap generates more sulfates than the pulp mill's equilibrium chemical balance requires. In a truly closed mill system, sulfuric acid recovery of tall oil would raise the sulfidity above the levels dictated by good pulping practice if all the sulfates were returned to the pulp mill recovery system. Therefore, it has become necessary in tall oil refineries related to paper mills to eliminate or substantially lessen the return of sulfates to the paper mill.

As stated, commercially recovered tall oil is acidified using sulfuric acid; and numerous attempts to acidify with other acids have been attempted. To liberate completely the crude tall oil from the soap in one step, it has been necessary to acidify by lowering to about pH 3.5. Therefore, attempts to use other acids, such as carbonic acid or $CO_2$ or a gas stream containing $CO_2$, have met with only partial success because of the inability to reach the lower pH range.

One process which does show promise for recovery of crude tall oil using $CO_2$ acidification is set forth in U.S. Pat. No. 3,901,869. However, because the process of U.S. Pat. No. 3,901,869 uses water and carbon dioxide when the mixture is acidified to a pH of about 7–8, only a portion of the tall oil soap is converted to the desired free acids.

It is thus the general object of this invention to provide a process for recovering crude tall oil from tall oil soaps.

Another object of this invention is to provide a process for the total acidification of tall oil soaps with carbon dioxide and a solvent.

Other objects, features and advantages of this invention will be evident from the following detailed description.

SUMMARY OF THE INVENTION

It has been found that repeated treatment of tall oil soap with carbon dioxide in the presence of a water-immiscible solvent results in almost complete acidification of the tall oil soap and removal of the lignin into the brine layer. The tall oil skimmings are usually treated as an aqueous solution of about 40% to 70% by weight skimmings, the solvent and carbon dioxide added and mixed, and the emulsion allowed to break. At preferred conditions, the emulsion breaks quickly allowing flexible use of equipment. The acidification may take place over a wide temperature range as temperature does not appear to affect the reaction.

DETAILED DESCRIPTION OF THE INVENTION

It is possible to recover substantially all of the rosin and fatty acids from skimmings using $CO_2$ acidification in the presence of a solvent. Consider the following equilibrium equation:

$$\text{tall oil soap}^- + \text{HOH} \rightleftharpoons \text{free tall oil acids} + \text{OH}^-$$

In the pulp mill, the high pH (high $OH^-$ concentration) will drive the equilibrium far to the left so that it is substantially all soap. On acidification with a strong acid to low pH values of say 3.5 as is now done during tall oil recovery, the $OH^-$ ions are removed and the equilibrium is driven far to the right. At intermediate values, there will be a specific amount of free acids and soap at any one pH value. The fraction of free acids to soap present will depend on the actual pH and the ionization constant of the acid. Thus, for fatty acid at its pKa of pH 7.5 in an aqueous system, half would be in the form of soap anions and half as the free acid. At pH 8, which can be easily reached by carbonation about 30% of the fatty materials are in the free-acid form according to accepted aqueous equilibria calculations. It forms an emulsion, however, which is difficult to separate into acid-soap and brine layers. The acid-soap layer occludes much water and brine.

If a water-immiscible solvent is added, a heterogeneous system develops in which the free fatty acids are more soluble in the added solvent than are the soaps. The acids are thus effectively removed from the aqueous equilibrium permitting carbon dioxide acidification of the water-borne soap to continue beyond that which would be expected. The degree of acidification is thus considerably more than would be expected from the aqueous equilibria. Fifty-five to sixty percent of the initial soap is converted to the free acids depending on the pressure at which it is carbonated. This acid-soap layer separates very readily and occludes almost no brine.

Carbon dioxide acidification in the first stage apparently stops only when the brine content of the aqueous layer increases to the point that the soap is only slightly soluble in it. At that time, the soap is all substantially dissolved in the solvent layer. If the brine is drawn off and fresh water added, a second stage carbonation may be conducted which converts substantially the same fraction of remaining soap into the free-acid form as occurred in the first stage.

By continuing the process, substantially all of the fatty acids and rosin acids are removed from the aqueous layer at about pH 8; and the brine returned to the mill contains only sodium bicarbonate.

The general procedure for recovering crude tall oil according to the process of this invention is to add carbon dioxide to an aqueous solution of tall oil soap skimmings, preferably at about 40% to 70% by weight solids, and solvent with vigorous mixing in a vessel until a homogeneous emulsion is formed, e.g., 15 minutes. Heating may, if desired, be used. The resulting emulsion is allowed to settle in a holding tank and separates into a bicarbonate-brine layer, lignin layer, and a tall oil soap-free acid and solvent layer.

Although simultaneous mixing with solvent and carbonation is preferred for simplicity, either batch, co-current or counter-current reactions, may be used. The first stage is preferably a batch or co-current reaction followed by a counter-current solvent-water-carbonation stage to exhaustively recover the remaining crude tall oil in its acid form.

The manner in which the carbon dioxide is contacted with the soap depends upon the form the carbon dioxide is in, for example, liquid, solid, gaseous or as carbonic acid. The carbon dioxide is added in at least a stoichiometric amount of soap. Only such excess carbon dioxide as is needed to neutralize excess sodium hydroxide and sodium lignates is recommended, as further excess carbon dioxide is likely to cause foaming. When using liquid carbon dioxide, the theoretical amount of liquid carbon dioxide is added slowly to avoid flashing of the liquid through the gas before reaction occurs.

A large number of solvents which are water-immiscible and which will dissolve sterols, rosin oils, and other high molecular weight natural materials may be used. Suitable water-immiscible solvents include aromatic and aliphatic hydrocarbons, high molecular weight monoalcohols, esters, ethers and ketones. Preferred water-immiscible solvents are, however, the aliphatic hydrocarbons having from five to ten carbon atoms or mixtures thereof; particularly suitable are hexane and naphtha. The amount of solvent added to the tall oil soap will depend to some extent on which solvent is used. In any event, enough solvent is used to have the emulsion break, say for example, a 1:2 solvent to tall oil soap weight ratio. The upper limit on the amount of solvent used is dictated by practical operating and economic considerations.

The process proceeds satisfactorily at atmospheric pressure; however, to increase the rate of reaction, higher pressures may be employed, say 10 p.s.i. to 40 p.s.i. and higher, e.g., 500 p.s.i. Pressure increases the degree of dissociation of weak acids so the pH obtained by carbon dioxide acidification decreases under pressure and shifts the equilibrium reaction toward complete acidification of the tall oil acids. Although temperature and amount of water present play an important role in prior art processes, the use of a water-immiscible solvent appears to negate these limitations as good recovery is obtained over a broad temperature range.

In a preferred operation, the solvent is added to carbonated skimmings in a counter-current reactor having one or more stages at a temperature between 40° F. and 300° F. After recovery of the solvent from the solvent-acid layer, a crude tall oil low in unsaponifiables having an acid number of 160–187 is obtained. This crude tall oil when fractionated in distillation equipment produces a line of high quality products.

An alternative for accomplishing successful $CO_2$ acidification of tall oil soaps is in the use of a staging process, wherein the first stage is carried out as described hereinabove; and the solvent/soaps-acid layer that has been previously carbonated is recarbonated.

The advantages of the process of this invention lie primarily in the ecological benefits obtained by eliminating or regulating the use of sulfuric acid in the process and thus not returning excess sulfates to the pulp mill, while at the same time obtaining complete recovery of crude tall oil and the soda content of crude tall oil soap.

The practice of this invention may be seen from the following examples.

EXAMPLE 1

This example illustrates the acidification of soap skimmings with carbon dioxide according to U.S. Pat. No. 3,901,869. To a 7.5-gallon kettle reactor were charged 20 pounds of tall oil soap and 32 pounds of water. The soap-water mixture was agitated until homogeneous. To the homogeneous soap-water mixture were added 1.88 pounds of liquid carbon dioxide. The carbonated soap, 18.25 pounds of aqueous soap-acids emulsion, was further acidified to pH 3.5 with 349.7 grams of concentrated sulfuric acid which yielded 3,762 grams of crude tall oil.

In order to determine the reduction in sulfuric acid needed for acidification, a blank was run wherein 18 pounds of tall oil soap were acidified to pH 2.8 with 960 grams of concentrated sulfuric acid. By comparison this resulted in a reduction of 56% of sulfuric acid needed to obtain the equivalent amount of crude tall oil.

EXAMPLE 2

To demonstrate the effectiveness of a single stage of this process on crude tall oil recovery, 750 grams of tall oil soap skimming (67% soap) were treated with 750 milliliters of hexane and 250 grams of water. The mixture was stirred and treated with crushed solid $CO_2$. The temperature was maintained around 30° C. As the mixture became more fluid, gaseous $CO_2$ was bubbled into the mixture through a gas dispersion tube. This was continued for about 2 hours until the pH was approximately 8.5 and the mixture was quite fluid. The mixture was then weighed and was found to have lost 168 grams. It was assumed that this loss was due mainly to hexane volatilization and so 168 grams of hexane was added back. The mixture was then transferred to the high pressure autoclave and heated under 500 p.s.i. $CO_2$ pressure to 160° F. (71° C) with rapid stirring. After holding at this temperature for 15 minutes, the mixture was cooled to 120° F. (49° C) vented, and an emulsion dumped. The emulsion separated immediately into two layers, a dark clear hexane layer and an aqueous layer containing precipitated lignin. The layers were separated and analyzed as follows:

Wt. of hexane layer = 892 grams
Wt. of aqueous layer = 522 grams
pH of aqueous layer = 7.9
Acid Number hexane layer = 44.0 ≡ 54% acid
Soap Number hexane layer = 37.5 ≡ 46% soap

EXAMPLE 3

Partial acidification and good separation of tall oil were achieved by treatment of tall oil soap with $CO_2$ in the presence of hexane at elevated temperature. Seven Hundred Fifty (750) grams of soap (66.9% solids), 495 grams of hexane and 250 grams of water were heated in a 2-liter autoclave to 300° F. The pressure was increased (from 100 p.s.i.) to 500 p.s.i. with $CO_2$ gas, and the mixture was held at 300° F. for 15 minutes. The mixture was then cooled to 140° F.; the pressure was relieved; and an emulsion was poured into a 2-liter beaker. There was an immediate sharp separation into two layers — a hexane layer (859.5 grams) and an aqueous layer (560.5 grams). The hexane layer was stripped of hexane in a rotary evaporator to 76% solids (mainly water remaining). The acid number of this stripped material was 94; and the soap number was 76, indicating that 55% of the soap was acidified by $CO_2$. The following analytical data has been obtained on this cook:

Hexane layer

Solids recovered = 407.0 grams = 52.6% yield
Acid Number = 94
Soap Number = 76
after complete acidification with $H_2SO_4$:
Acid Number = 174

Aqueous layer

Solids extracted (ether) = 24.4 grams = 3.3% yield
Acid Number = 163
Amount $CO_2$ consumed (calculated from titration of aqueous layer) = 49.5 grams The same procedure has been carried out at 80° F., 150° F., 200° F. and 250° F. At the other temperatures, similar results to that at 300° F. were obtained, indicating that the high temperature is not necessary.

EXAMPLE 4

To illustrate the effectiveness of multiple carbonation stages in completely acidifying tall oil soap at pH values no lower than pH 7, the following series were run. In the first stage, 750 grams of tall oil soap (67.0% solids) were combined with 750 milliliters of hexane and 250 milliliters of water in an autoclave. The mixture was heated to 300° F. under 500 p.s.i. $CO_2$ pressure and held for 15 minutes with good agitation. It was cooled to 140° F. and poured into a separatory funnel. Immediate separation into two layers occurred. The following weight balance and analyses were obtained:

Weight balance

Total recovered from reactor = 1,445.7 grams
Total hexane layer = 702.9 grams
Total aqueous layer = 542.8 grams
pH of aqueous layer = 8.2

Assay of hexane layer

Acid Number = 48.4 = 59.5% acid
Soap Number = 33.2 = 40.5% soap
Thus, 60% of the tall oil soap had been acidified when only about 30% would have been predicted from the aqueous equilibrium.

The remaining hexane layer was recharged into the autoclave for the second stage of carbonation and 500 grams of water added. It was again heated to 300° F. and 500 p.s.i. $CO_2$ pressure applied for 15 minutes with agitation. After cooling to 140° F., the charge was poured into a separatory funnel. Again, immediate separation occurred.

Total recovered from reactor = 1,317.0 grams
Total hexane layer = 747.0 grams
Total aqueous layer = 542.8 grams
pH of aqueous layer = 7.9

Analysis of hexane layer

Acid Number = 76.2 = 87.0% acid
Soap Number = 11.6 = 13.0% soap
The hexane layer was again charged into the autoclave with 500 milliliters water and heated to 300° F. under 500 p.s.i. $CO_2$ for the third stage of carbonation. After 15 minutes, the autoclave was cooled to 140° F. and poured into a separatory funnel.

Total recovered from reactor = 1,167.0 grams
Total hexane layer = 652.0 grams
Total aqueous layer = 515.0 grams
pH of aqueous layer = 7.0

Analysis of hexane layer

Acid Number = 87.4 = 96.0% acid
Soap Number = 3.9 = 4.0% soap
Solids in layer = 55.7%

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A process for treating tall oil soap skimmings comprising admixing said skimmings with a water-immiscible solvent and an amount of carbon dioxide sufficient to acidify said soap to pH 7 to 8, whereby a water-immiscible solvent layer containing said acidified soap and unreacted soap is formed and a bicarbonate-brine layer is formed.

2. The process of claim 1 wherein said solvent is an aliphatic hydrocarbon from five to ten carbon atoms and mixture thereof.

3. The process according to claim 1 wherein said solvent is hexane.

4. The process according to claim 1 wherein said process is carried out at from 10 p.s.i. to 500 p.s.i.

5. The process according to claim 1, further comprising, separating said solvent layer, adding fresh water and recarbonating.

6. The process of claim 4, further comprising, separating said solvent layer, adding fresh water and recarbonating.

7. The process according to claim 5 wherein said recarbonating step is repeated until substantially all of the crude tall oil is recovered.

8. A process for acidification of tall oil soaps which comprises;
 a. acidifying tall oil soaps with carbon dioxide,
 b. co-currently mixing hexane and said tall oil soap to form an emulsion.
 c. introducing said mixture into a holding tank wherein said emulsion is allowed to break into a solvent/soap-acid layer and a bicarbonate/brine layer,
 d. separating said layers, and
 e. recovering tall oil acids.

* * * * *